United States Patent [19]

Paureau

[11] 4,079,948
[45] Mar. 21, 1978

[54] SEALING DEVICE

[75] Inventor: Jean Julien Paureau, Echirolles, France

[73] Assignee: Agence Nationale de Valorisation de la Recherche (ANVAR), Neuilly, France

[21] Appl. No.: 618,426

[22] Filed: Oct. 1, 1975

[30] Foreign Application Priority Data

Oct. 4, 1974    France .................................. 74 33478

[51] Int. Cl.² ........................................... F16L 17/00
[52] U.S. Cl. ..................................... 277/27; 277/170; 277/236
[58] Field of Search ................... 277/170, 115, 235 A, 277/236, 116–122, 168, 169, 171, 110, 27, 190, 191

[56] References Cited

U.S. PATENT DOCUMENTS

| 843,230 | 2/1907 | McCarthy | 277/120 |
| 911,156 | 2/1909 | Politz | 277/170 |
| 1,419,436 | 6/1922 | Wright | 277/169 |
| 1,710,203 | 4/1929 | Burstall | 277/169 |
| 3,104,121 | 9/1963 | Norden et al. | 277/236 X |
| 3,285,631 | 11/1966 | Stolpmann | 277/235 A |

Primary Examiner—Richard E. Aegerter
Assistant Examiner—John W. Shepperd
Attorney, Agent, or Firm—Flynn & Frishauf

[57] ABSTRACT

A sealing device for high pressures which comprises a seal located in the annular space formed between a revolving shutter and a coaxial surrounding seating therefor, the annular space being limited by four surfaces associated in pairs as front surfaces and rear surfaces, wherein the intersections with an immaterial semi-plane limited by the axis of the device of the two surfaces are a couple of straight-line segments forming a first acute angle whose apex occupies a rear position relative to the said segments, whereas the intersections of the two rear surfaces with the semi-plane are a second couple of straight-line segments forming a second angle less acute than the first and whose apex occupies a rear position relative to the second couple of straight-line segments.

6 Claims, 3 Drawing Figures

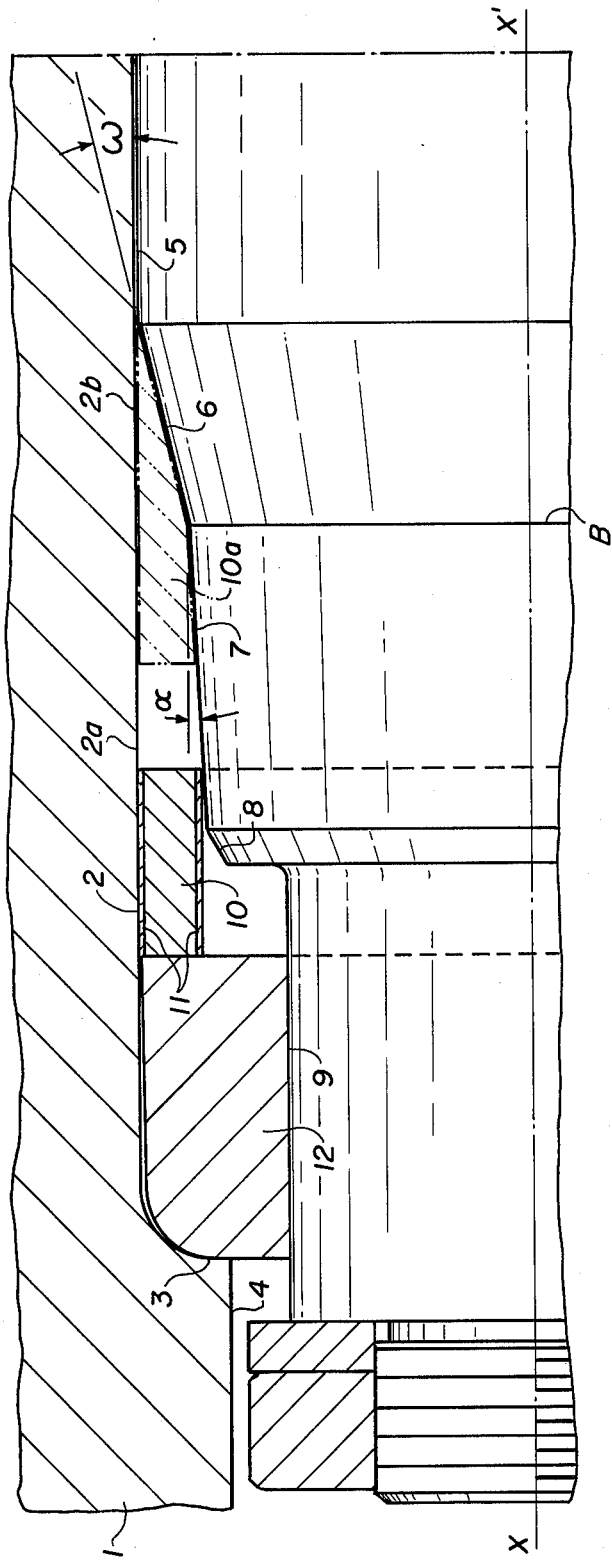
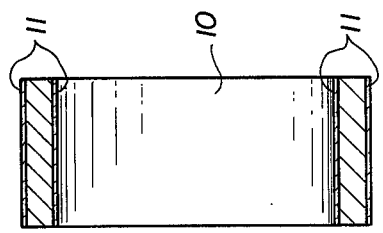

SEALING DEVICE

BACKGROUND OF THE INVENTION

In Rev. Phys. Appl. 4, 467 (1969), G. Malfait and D. Jerome described a sealing device used in particular for sealing the opening of an enclosure containing a highly pressurized fluid. A revolving shutter is engaged into the aperture and forced by means of an external head into a stack of three annular sealing joints. This stack, composed in this order of a copper seal (in contact with the pressurized fluid), a zinc seal and a stainless steel seal (in contact with the atmosphere), is jammed in the annular space delimited by the bearing in the shape of a trucated cone of the shutter and a cylindrical seat. On the inwardly turned side of the enclosure, the straight section of the opening is reduced by a shoulder to a value that is at most equal to the small base of the shutter in the shape of a truncated cone. At its end nearest to the outside, or rear end, the bearing ends in a fillet. In a device of this type, pressure is exerted directly upon the seals; the latter become plastically deformed without, however, creating on the bearings excess pressures likely to give rise to the contraction of the shutter as takes place at high pressures in the devices operating with Bridgman seals called "with non-supported area."

It has now been found that it was not necessary to use three seals and that only one could be sufficient to obtain fluid-tightness. However, two major drawbacks are revealed. On the one hand, fluid-tightness is obtained only for the first pressure rise (which requires the replacement of the seal after each return to atmospheric pressure). Furthermore, the seals seize more and more upon the bearings as pressure rises follow one another. The consequence is a plastic flow which is increasingly irregular and asymmetrical, giving rise to considerable inner radial forces at high pressures.

To avoid these drawbacks recourse has been had to seals coated with cadmium. Indeed, cadmium has the property of not seizing on steel. Moreover, as it is a soft metal, it retains fluid-tightness after returning to atmospheric pressure.

In that way a device has been produced ensuring a reproducible seal-tightness and using only one seal whose plastic flow under the action of pressure retains a symmetry of revolution. The performances of this device, however, are relatively low. (For example, with a cadmium-coated copper seal, fluid-tightness is no longer ensured over 7 kbar). It has been observed that this limitation of the performances was due to the presence of the fillet. Indeed, it is seen that the annular space comprised between the fillet and the cylindrical seat is rather quickly filled in by the seal: the plastic flow disappears and the seal ceases to provide tightness. The solution permitting the increase of the performances of the device consists in doing away with the fillet, by extending the conical bearing of the shutter as far as the seat. Unfortunately, tests show that under those conditions certain zones of the seal flow more quickly than others towards the base of the shutter. The symmetry of revolution of the joint is destroyed and again there appear internal forces which may become very intensive at high pressures. To avoid these drawbacks a break of slope has been provided on the bearing of the shutter. The mechanism by means of which the plastic flow of the seal is regularized is as follows: The areas of the seal which are the first to reach the break of slope meet with a resistance which increases rapidly. The rate of flow of these areas decreases and becomes less than that of the parts of the seal situated upstream relative to the break of slope; consequently there is a fast restoration of the symmetry of revolution of the seal.

OBJECT OF THE INVENTION

The invention aims at an improved sealing device which permits obtaining reproducible tightness for gases (including helium), in a range of temperatures covering low and high temperatures, at a pressure higher than that tolerated by previous devices, which allows for a considerable increase of the dimensions of the seat under the action of pressure, which requires only little clamping to start the tightness, which may have radial dimensions smaller than those of previous devices, which makes use of a smaller number of constituent elements and which is simpler to manufacture, while retaining the advantages of the devices in which pressure is exerted directly upon the seals; in particular any danger of contraction of the shutter is prevented.

BRIEF SUMMARY OF THE INVENTION

According to the present invention, a sealing device for high pressures comprises a seal jammed in the annular space situated between a revolution shutter and its conjugated coaxial seat surrounding it. This annular space is limited by four surfaces associated pairwise, as front surfaces and rear surfaces.

The intersections with an immaterial semi-plane limited by the axis of the device of the two surfaces are a pair of straight-line segments forming a first acute angle whose apex occupies a rear position relative to the said segments, whereas the intersections of the two rear surfaces with the semi-plane are a second pair of straight-line segments forming a second angle less acute than the first and whose apex occupies a rear position relative to the second pair of straight-line segments.

As the seat is cylindrical, the shutter may be made in the form of two truncated cones, one forward, one rear; this is usually the case of the seal between parts that are not moving relative to each other. But it is also possible to produce the shutter in the form of a cylinder, the seat being then made up of two surfaces in the shape of a truncated cone; this is the case of the seal sliding on a piston rod. In these two examples, the plastic flow of the seal takes place parallel with the axis of revolution. But it is also possible to define the surfaces of the seal and of the shutter so that the plastic flow of the seal takes place perpendicularly to the axis of revolution, this is the case with the lens-shaped seal. Generally speaking, the two conjugated elements may be given conical shapes which define between them the shape required, according to the invention, for the annular space.

The improvement of the efficiency of the device is such that one single seal, instead of a stack, is sufficient to obtain excellent gas-tightness.

To prevent the contraction of the seal during the return of the enclosure to atmospheric pressure, the conicities of the annular space must satisfy the inequation $a + w < 4f$, in which $f$ is the angle of friction of the joint on the material constituting the shutter and the seat, and $a$ and $w$ are the first and second acute angles.

The angle of friction depends upon the nature of the anti-seizing coating applied on the seal. This coating must be in a soft material, compatible with the materials constituting the parts of the enclosure. In particular when the latter are made of steel (to the exclusion of austenitic stainless steels) or of light alloys, cadmium or indium coatings, of 10 μ thickness, give good results. In the majority of cases, the coating is cadmium, and the angle of friction is then 4°. In that event the total $(a+w)$ must be below 16°. Two reasons militate in favor of a low as possible a value for $a$: on the one hand, the clamping of the head necessary to initiate tightness is all the less intensive as $a$ is smaller; on the other hand, the break of slope is all the more pronounced, and therefore efficient, as $a$ is smaller.

However, to prevent any uncertainty as regards the initial positioning of the seal, choosing too small values of $a$ is avoided. Good results have been obtained when $a$ ranges from about 2° to 4°. For the above-stated value of $f$, $w$ then varies between 14 and 12°.

These parameters having been settled, the length of the rear portion governs the thickness of the seal. As the diameter of the opening of the enclosure is all the smaller as the thickness of the seal is small, it is therefore possible to obtain a smaller diameter of opening than in the previous devices by decreasing the length of the rear portion.

BRIEF SUMMARY OF THE DRAWINGS

In the attached drawing, given solely for the sake of example:

FIG. 2 is a cross-sectional view of a seal according to the invention, and FIG. 3 is a view on an enlarged scale of part of FIG. 1.

DESCRIPTION OF EMBODIMENT

Figure 1:
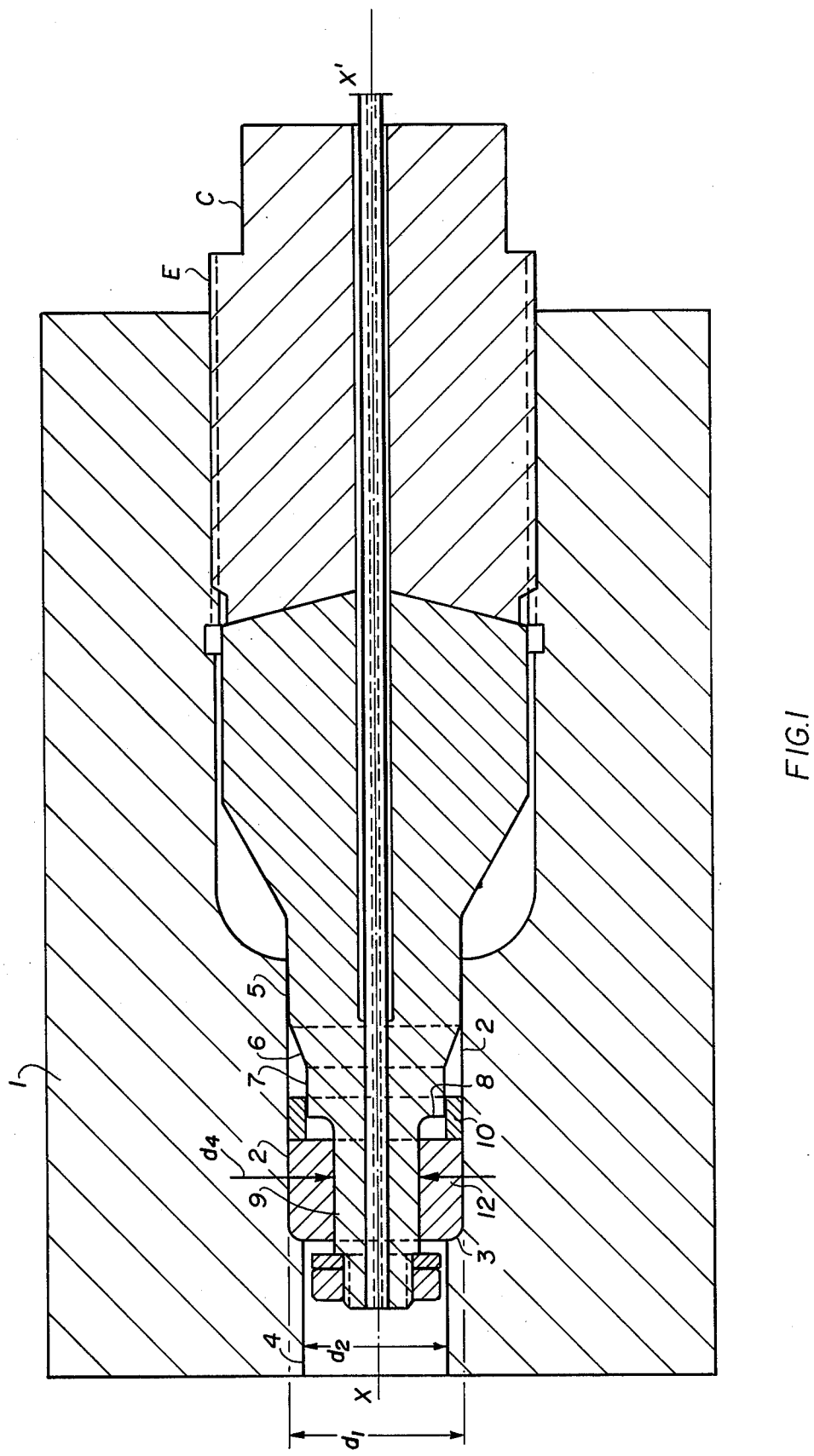
FIG. 1 is a partial cross-sectional view along a plane passing along the opening of an enclosure provided with a sealing device according to the invention.

The highly-pressurized fluid, which may be gaseous helium, is contained in an enclosure 1. The opening of enclosure 1 comprises from the rear forwards (from right to left in FIGS. 1 and 3) an internally-threaded inlet E, in which a head C is screwed, connected with a cylindrical section 2 of diameter $d_1$, constituting the whole of the seat; the section 2 is followed at its forward end by a shoulder 3 projecting towards the axis XX' of the opening, then by a cylindrical section 4 of diameter $d_2$ opening onto the inside of the enclosure 1.

A revolution shutter, having the same axis XX' as the opening, is engaged into the latter and has, from the front to the rear, a cylindrical section 9 whose diameter $d_4$ is less than $d_2$, a connecting section followed by an inlet chamber 8, a forward truncated cone section 7, which is generally 5 mm long, and whose half-angle at the apex is equal to 3°, a rear truncated cone section 6 which is generally 3 mm long, and whose half-angle at the apex is equal to 13° (when the seals are cadmium coated), and finally, a cylindrical section 5 of diameter $d_1 - \epsilon$. In addition, a capillary duct passes through the shutter placing the enclosure in communication with the outside. The section 2 has a forward portion 2a and a rearward portion 2b which are integrally connected and which are respectively opposed to sections 7 and 6 of the shutter at the same axial positions as the respective sections 7 and 6 of the shutter. The sections 6 and 7 of the shutter meet at a break of slope B.

Between the section 2 and the sections 6 and 7 an annular seal 10 is jammed; it is about 1 mm thick and is generally covered with a soft coating 11 which has the property of preventing seizing (FIG. 2).

Between sections 2 and 9 a removal ring 12 is slidably mounted.

The initial gas-tightness is created by forcing the shutter into the seal 10 backed by the ring 12, by clamping the head C (FIG. 1). The fluid can then be pressurized in the enclosure; it forces the seal 10 to flow in the annular space comprised between the seat 2 and the shutter. With each pressure value an equilibrium position of the seal is associated. That which corresponds to the limit pressure, that is to say that beyond which the seal 10 ceases to be fluid-tight on the first pressure rise is represented at $10_a$ in FIG. 3. The initial width of the seal 10 is selected so that it distributes itself equally over the front and rear portions of the shutter, when it is in position $10_a$.

The tests made permit the obtaining of a limit pressure of 12 kbar with a cadmium-coated copper seal 10 and a steel seat and shutter.

With another identical device it was possible to achieve four rises to 11 kbar without leaks.

With a seal in a copper-beryllium alloy two rises to 17 kbar without leaks are achieved. No third pressure rise was attempted. Extrapolation calculations show that the limit pressure is about 20 kbar.

I claim:

1. A sealing device for high pressure comprising:
a shutter having a revolution axis and having a forward side-surface (7) and a rearward side-surface (6) connected together along a break of slope;
a shutter seat coaxial with said shutter and having a forward side-portion (2a) which is opposed at the same axial position to said forward side-surface (7) of said shutter and a rearward side-portion (2b) which is opposed at the same axial position to said rearward side-surface (6) of said shutter the forward and rearward side-surfaces of said shutter delimiting, with said forward and rearward side-portions of said shutter seat, an annular space, the rear ends of said rearward side portion and surface being substantially adjacent and defining a rear end of said annular space, the intersections of said forward side-surface (7) and said forward portion (2a) with an imaginary semi-plane limited by said revolution axis being a first pair of straight-line segments forming jointly a first acute angle the apex of which occupies a rear position relative to said straight-line segments, while the intersections with said imaginary semi-plane of said rearward side-surface (6) and rearward portion (2b) are a second pair of straight-line segments forming a second acute angle which is larger than said first angle and the apex of which occupies a rear position relative to said second pair of straight-line segments;
said shutter seat at least partly defining a seal receiving space forward of said break of slope; and
a plastically deformable seal (10a) movable from said seal receiving space into said annular space under influence of said high pressure and being jammed in said annular space, said seal being plastically deformed in said annular space so as to be in contact with both said forward and rearward side-surfaces and both said forward and rearward side-portions along said break of slope.

2. A device according to claim 1, in which the seal is coated on its surfaces in contact with the shutter with a coating of soft material.

3. A device according to claim 2, in which the soft material is selected among cadmium and indium.

4. A device according to claim 2, in which $a$ being the first acute angle, $w$ the second acute angle and $f$ the angle of friction of said soft material on the material of one of the shutter and the shutter seat, the inequality $(a + w) < (4f)$ is satisfied.

5. A device according to claim 4 in which $a$ is an angle between about 2° and 4°.

6. A device according to claim 15 in which said seal is distributed substantially equally between said front surface and said rear surface.

* * * * *